C. W. METCALF.
PIPE TAPPING MEANS.
APPLICATION FILED JUNE 11, 1910.
1,016,026.
Patented Jan. 30, 1912.
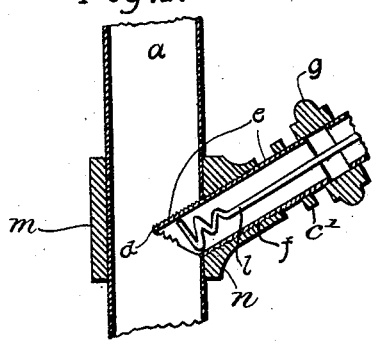
Fig.1.
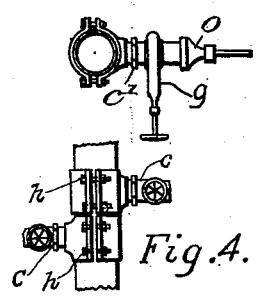
Fig.3.
Fig.4.
Fig.6.
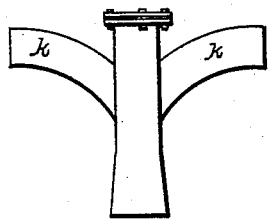
Fig.2.
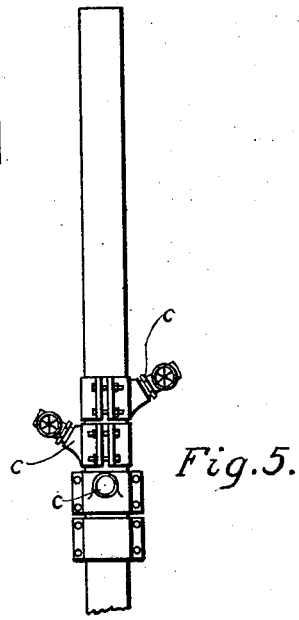
Fig.5.
Fig.7.
WITNESSES:
Benjiman F. Bowman.
Frank Heath
INVENTOR
Charles W. Metcalf
BY
A. B. Bowman
ATTORNEY

UNITED STATES PATENT OFFICE.

CHARLES W. METCALF, OF SAN DIEGO, CALIFORNIA.

PIPE-TAPPING MEANS.

1,016,026.  Specification of Letters Patent.  Patented Jan. 30, 1912.

Application filed June 11, 1910.  Serial No. 566,374.

*To all whom it may concern:*

Be it known that I, CHARLES W. METCALF, a citizen of the United States, residing at San Diego, in the county of San Diego and State of California, have invented certain new and useful Improvements in Pipe-Tapping Means, of which the following is a specification.

My invention relates to devices for regulating and stopping the flow of liquids and gases under pressure in pipes, and is more particularly adapted to the controlling of the flow of oil, gas and Artesian wells, and the objects of my invention are, first, to provide a device for tapping pipes under pressure therein, to reduce the pressure in the main pipes; second, to provide a means for plugging said main pipe and stop the flow therefrom of its contents; third, to provide a cap for stopping the flow from said main pipe of its contents and fourth, to provide means for distributing the contents of said main pipe. I attain these objects by the device illustrated in the accompanying drawings, in which:—

Figure 1 is a sectional view of a pipe and of a portion of my device for tapping and inserting relief pipes therein, Fig. 2 is a side elevational view of the device for capping said main pipe after the pressure has been reduced, Fig. 3 is a top or end view of a main pipe showing my device in position for tapping it, Fig. 4 is an elevational view of a main pipe showing relief pipes inserted at right angles, Fig. 5 is the same view showing relief pipes inserted at other than right angles and at various positions around said main pipe, Fig. 6 is a side elevational view of my device for plugging the main pipes, and Fig. 7 is an elevational view of a portion of relief pipe $c$ showing the cutting means thereon.

Similar characters of reference refer to similar parts throughout the several views.

$a$ represents the main pipe which is provided with a plurality of clamps, which are made in two sections $m$ and $n$ and are held together in position by bolts $h$. The portion $n$ of said clamps are reinforced as shown, and provided with a threaded hole $f$, and the threaded end $e$ of relief pipe $c$ is screwed into said threaded hole $f$ in portion $n$. Relief pipe $c$ is also provided with a tempered steel end $d$ adapted for cutting through the walls of main pipe $a$ when relief pipe $c$ is screwed through the threaded hole $f$. On the inner side of said relief pipe is provided a spring thrust rod $l$, shaped as shown, and adapted to thrust the part of the pipe $a$ which is cut away by cutter $d$ on relief pipe $c$ and it is so shaped that it will not catch on the inner edge of said relief pipe $c$. This thrust rod $l$ is held in its relative position by frictional contact with stuffing box $o$. Pipe $c$ is provided adjacent to its threaded portion with a hexagonal reinforcement $c^1$ shrunk thereon and adapted to a wrench for turning said relief pipe. Pipe $c$ is also provided with a gate valve $g$, and on its extended end with a stuffing box $o$.

As many taps as are necessary to control the flow of the contents of pipe $a$ are made in said main pipe. The service pipe is preferably left in position as shown in Fig. 1 so that the longer portion will guide the contents into the relief pipe. After a tap is made the thrust rod $l$ is drawn out through the stuffing box $o$ until it is past the valve $g$, when the said valve is closed, and the stuffing box and thrust rod are removed therefrom, and a distributing pipe is attached to said relief pipe $c$ and a portion of the contents of pipe $a$ are permitted to flow through the relief pipe $c$ by opening valve $g$. When sufficient relief pipes $c$ have been introduced into pipe $a$ to reduce the pressure therein, the plug shown in Fig. 6 which is a simple tapered plug may be inserted into pipe $a$, thus causing all the flow of the contents of pipe $a$ to pass through relief pipes $c$. Instead of using the plug shown in Fig. 6, the cap shown in Fig. 2 can be placed on pipe $a$ and its contents be conveyed through distributing pipes $k$ to where desired, thus providing additional distributing pipes.

Having thus described my invention, what I claim as new and desire to secure by Letters Patent is:—

1. A device of the character described, comprising a clamp provided with a threaded hole and adapted to be placed around a main pipe, a relief pipe provided with a cutting end threaded to correspond with the threaded hole in said clamp and adapted to be screwed into said threaded hole and thence through the wall of said main pipe, and a valve means for regulating the flow of liquid from said main pipe through the opening therein, all substantially as set forth.

2. A device of the character described comprising a clamp provided with a threaded hole, a relief pipe equipped with a cutting end adapted to screw in said threaded hole, a valve in said relief pipe, and a spring thrust rod extending through said valve in said relief pipe, approximately to its end, all substantially as set forth.

In witness whereof, I have hereunto set my hand in the presence of two subscribing witnesses.

CHARLES W. METCALF.

Witnesses:
 CLAUD T. DAVENPORT,
 BENJIMAN F. BOWMAN.

Copies of this patent may be obtained for five cents each, by addressing the "Commissioner of Patents, Washington, D. C."